United States Patent
Kilgore

(10) Patent No.: US 6,364,368 B1
(45) Date of Patent: Apr. 2, 2002

(54) INTERNAL FLUSH COUPLING FOR COMPOSITE COILED TUBING

(75) Inventor: Marion D. Kilgore, 2424 Harbinger La., Dallas, TX (US) 75287

(73) Assignee: Marion D. Kilgore, Dallas, TX (US)

( * ) Notice: Subject to any disclaimer, the term of this patent is extended or adjusted under 35 U.S.C. 154(b) by 0 days.

(21) Appl. No.: 09/421,698

(22) Filed: Oct. 20, 1999

(51) Int. Cl.$^7$ ................................. F16L 33/00
(52) U.S. Cl. ..................... 285/251; 285/334.5
(58) Field of Search ............... 285/251, 246, 285/247, 334.2, 245, 40

(56) References Cited

U.S. PATENT DOCUMENTS

| | | | | |
|---|---|---|---|---|
| 2,540,113 A | * | 2/1951 | Hartley et al. ............... | 285/245 |
| 2,549,741 A | * | 4/1951 | Young ..................... | 285/334.5 |
| 2,991,093 A | * | 7/1961 | Guarnaschelli ............. | 285/110 |
| 3,598,428 A | * | 8/1971 | Smith ..................... | 285/423 |
| 3,685,860 A | | 8/1972 | Schmidt | |
| 3,907,335 A | | 9/1975 | Burge et al. | |
| 4,032,177 A | | 6/1977 | Anderson | |
| 4,076,280 A | * | 2/1978 | Young ..................... | 285/39 |
| 4,437,689 A | * | 3/1984 | Goebel et al. ............... | 285/246 |
| 4,729,583 A | * | 3/1988 | Laikos et al. ............... | 285/149 |
| 4,936,618 A | | 6/1990 | Sampa et al. | |
| 5,156,206 A | | 10/1992 | Cox | |
| 5,178,423 A | * | 1/1993 | Combeau ................. | 285/247 |
| 5,240,291 A | * | 8/1993 | Zornow .................... | 285/40 |
| 5,332,271 A | * | 7/1994 | Grant et al. ............... | 285/334.5 |
| 5,443,099 A | | 8/1995 | Chaussepied et al. | |
| 5,735,553 A | * | 4/1998 | Niemiec .................... | 285/101 |
| 5,933,945 A | | 8/1999 | Thomeer et al. | |

FOREIGN PATENT DOCUMENTS

| | | | | |
|---|---|---|---|---|
| AU | 0227061 A | * | 11/1958 | ............... 285/247 |
| FR | 1147894 A | * | 12/1957 | ............... 285/247 |
| GB | 0740754 A | * | 9/1952 | ............... 285/251 |
| GB | 0740717 A | * | 11/1955 | ............... 285/246 |

* cited by examiner

Primary Examiner—B. Dayoan
Assistant Examiner—Carlos Lugo
(74) Attorney, Agent, or Firm—Loren G. Helmreich

(57) ABSTRACT

A coupling 10 for use with composite coiled tubing 12 connects the coiled tubing 12 to a tool or other tubing member. The coupling 10 may include a female coupling component 26 and a male coupling component 28, with a substantially flush internal bore through the coupling 10 concentric with the coiled tubing. The female component 26 may include a tapered, negative flank thread profile 32 for engagement with the coiled tubing 12, and preferably provides a fluid tight seal and axial joint strength substantially as strong as the coiled tubing 12. Another embodiment of the coupling 70 may include a smooth tapered inner surface 76 for bonding engagement with the coiled tubing 12. In addition, a double male flush joint adapter 80 may be used to connect multiple strings of composite coiled tubing 12 and may also provide a substantially flush internal joint.

27 Claims, 2 Drawing Sheets

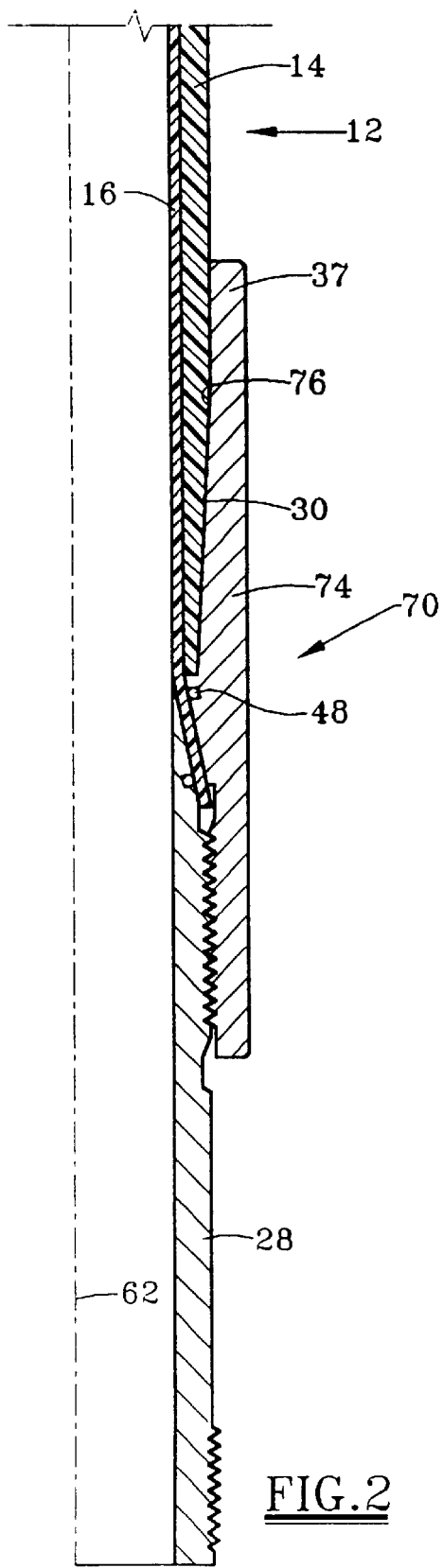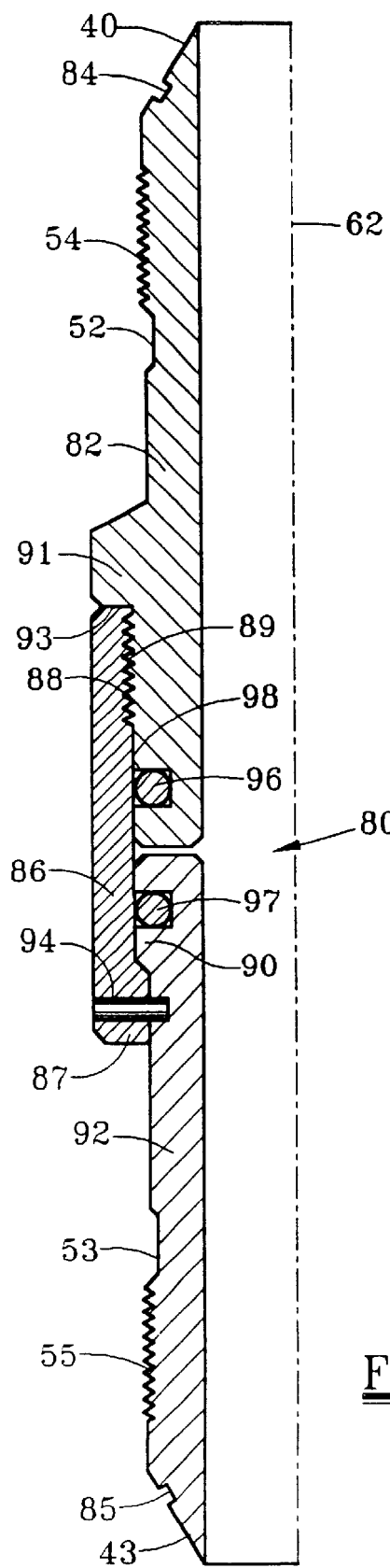

INTERNAL FLUSH COUPLING FOR COMPOSITE COILED TUBING

FIELD OF THE INVENTION

This invention relates generally to couplings for use with coiled tubing and, more specifically, to couplings and adapters for connecting composite coiled tubing to other tools or tubing.

BACKGROUND OF THE INVENTION

Coiled tubing has been used successfully in the oil and gas industry for many years. The development of new technology has expanded its role in completion, workover, drilling and production applications. The vast majority of technology and applications have focused on metallic coiled tubing and a variety of connections and adapters have been developed. Connectors for coupling consecutive strings of tubing have been developed, as have connectors for attaching a variety of well service and production tools or components to coiled tubing.

Although uses for metallic coiled tubulars have significantly increased in the past twenty years, limitations are experienced on occasion with metallic tubulars, including tensile strength limitations due to string weight and corrosion susceptibility from inhospitable conditions. Technology advancements in non-metallic, composite based coiled tubing products have facilitated solutions to many of the limitations encountered with metallic coiled tubing. Composite tubing is commonly composed of a combined resinous-fibrous outer tube concentrically encompassing a plastic inner tube, with the inner tube substantially providing sealing and flow properties and the outer tube substantially providing the strength and protective properties. When manufactured, the inner tube becomes an integral part of the outer tube. As compared to steel tubulars of like size, composite tubulars tend to have lower weight, superior burst properties, improved flow coefficients and increased fatigue resistance, while steel tends to exhibit more favorable collapse, compressive and tensile properties. Thus, in certain applications, composite tubulars are a direct alternative to steel while in other applications composites are the highly preferred option.

The physical properties of composite coiled tubing pose challenges and opportunities for the development of new technology to exploit the advantages of composite tubulars. One such opportunity relates to coupling composite coiled tubing strings either consecutively, to metallic coiled tubing or to service and/or production tools. Terminals (splices or joints) for composites tubulars are different from terminals for steel tubulars.

Technological advancements in tubular connections have been introduced over the years with a variety of couplings for connecting rigid non-metallic and flexible tubing and hoses. The prior art demonstrates a diversity of compression type couplings (e.g. Schmidt U.S. Pat. No. 3,685,860; Burge U.S. Pat. No. 3,907,335; and Anderson U.S. Pat. No. 4,032,177) grapple type couplings (e.g. Sampa 4,936,618) and wedge-style or slip- type couplings (e.g. Cox U.S. Pat. No. 5,156,206). However, the prior art fails to simultaneously achieve a combination of coupling characteristics, which are preferred for use with composite coiled tubing when used in subterranean wells. For example, prior art connections fail to provide a satisfactory mechanism for attaching threaded components to composite coiled tubing without a reduction in tensile strength or loss of positive sealing ability. In addition, otherwise desirable prior art connections fail to achieve an internally flush connection. For connecting flexible or composite tubulars, the prior art often makes use of internal cylindrical nipples supporting the connection, thereby resulting in a reduction of internal diameter. Also, threaded connections with mated positive-angle bearing threads tend to unzip or progressively shear under tensile loading.

Common grapple-type connections also frequently tend to be rather bulky, having relatively large external diameters, thus restricting the range of useful applications of larger sizes of coiled tubing to relatively larger outer tubing or casing strings. In addition, grapple and slip type couplings, which have been used successfully on metallic coiled tubing, commonly rely on compressive friction engagement to provide tensile strength in the connection. However, composite tubulars typically have a relatively lower hoop stress and crush resistance compared to steel tubulars. Therefore, grapple and slip type couplings do not provide adequate tensile strength when used with composite tubing. It is desirable, therefore, to have an improved coupling for use with composite coiled tubing to connect the tubing to other composite tubing or to metallic components without a reduction in internal diameter and with a joint efficiency exceeding 100% of the tensile strength of the tube body, while maintaining a leak-free, positive seal.

In order for tubing to be commonly accepted by operators for use as production tubing, it is highly desirable to provide a full ID joint in order to minimize pressure drops and facilitate unrestricted passage of the largest possible OD tools through the tubing. Not only will it normally be necessary to join lengths of tubing (splices), but also the tubing will have to be joined to various downhole completion tools and instruments which will be run in production wells, including, for example, landing nipples, safety valves, packers, instrumentation telemetry packages and items related to "smart" well completions.

SUMMARY OF THE INVENTION

A typical system for a coiled tubing operation involves a rather long length of coiled tubing, either steel, composite or other material, wound onto a relatively large reel. This invention pertains primarily to composite, plastic or resinous-based coiled tubulars. Typically, the tubing is fitted with a tool or instrument on the extended end, which is then mechanically deployed and/or retracted down a wellbore for either permanent or temporary application by winding the coiled tubing reel. Most applications necessitate coupling tools or consecutive strings of tubing together to effect the desired operations.

The present invention provides a coupling and method for connecting composite coiled tubing and affords solutions to some of the challenges of coupling composite coiled tubing to either another string of tubing or any other connection. This invention offers advantages over the prior art in that it better exploits composite coiled tubing's advantages by offering a coupling which may have a high tensile holding strength and a full-bore, unrestricted, internal flush joint connection with a relatively small external upset coupling. The coupling may provide tensile strength and pressure rating properties equal to those properties of the coiled tubing body. The coupling may fully protect the tip-end of the composite tubing and in provides a fluid tight seal with the coiled tubing. In addition, the coupling is relatively simple in design and operation. The coupling may be applied in the field using common hand tools and conventional tools to effect the proper taper on the tubing.

One primary object of this invention is to provide a coupling that offers a joint efficiency equal to or greater than the coiled tubing body such that the coupling is not the limiting component of tensile strength. Two embodiments are disclosed in detail which afford this characteristic. The first embodiment preferably utilizes a specially designed thread profile in the threaded female adapter, which provides full body strength in the joint. A second embodiment bonds the coiled tubing to an unthreaded female adapter.

In the first embodiment, the female adapter may be comprised of a generally cylindrical, metallic coupling with two sets of inner threads; one for engaging the composite coiled tubing and one for engaging a male adapter or other male connecting component. Threads for engaging the coiled tubing preferably have a negative flank with a load-bearing angle that encourages deeper engagement into the outer layer of composite material with an increase in tension. The threads taper radially inward along the center axis of the adapter, running toward the axial midpoint of the adapter. The external surface of a composite coiled tubing string may be trimmed with a matching taper, but need not be threaded. When the coupling is threaded onto the tubing, the smooth, tapered, male end of the tubing engages the tapered threads of the female adapter. Additionally, the female adapter preferably extends axially along a portion of the external, non-tapered coiled tubing body to provide support to the connection.

The conical taper of the threads on the female adapter for engagement with the coiled tubing creates substantially even loading along the threaded engagement. These threads in the female adapter are preferably shaped with a negative bearing flank, which, unlike neutral or positive flank, do not tend to "unzip" as tensile forces increase. As tensile force increases, the tapered thread profile with the negative flank, which is engaged with the external surface of the coiled tubing, tends to further imbed into the non-threaded, external, tapered surface of the composite coiled tubing. Tensile loads generate substantially only shearing forces on the thread, which can be easily calculated. An advantage of this connection is that the connection does not depend upon the hoop stress of the tubing for holding strength and therefore does not require an inner nipple to support the gripping surface of the coiled tubing.

A second embodiment of a coiled tubing coupling involves bonding the coiled tubing to the female adapter. In this embodiment, the internal, negative flank threads of the female adapter may be replaced with a smooth, non-threaded, conical surface. The internal surface of the female adapter for engagement with the coiled tubing has a smooth bore, conical taper to match the external taper on the coiled tubing. A bonding agent adheres the coiled tubing to the female adapter. This method of attachment also provides tensile strength in excess of the coiled tubing body. In this embodiment, the female adapter may also extend axially along a portion of the non-tapered tubing body.

It is also an object of this invention to provide a fluid tight seal in the connection for reliably sealing with the coiled tubing. This seal may be effected by engaging a male adapter, which may be threaded, but need not be threaded, with the female adapter. The engaged end of the male adapter may have a frustoconical external surface, which may have an annular groove containing an O-ring. The composite coiled tubing may have a portion of the inner plastic liner of the coiled tubing exposed, which may protrude beyond the previously discussed portion of the coiled tubing which is threaded to the female adapter. This exposed plastic liner may be flared slightly to accept the male adapter. As the male adapter engages the female adapter, the flared plastic liner is compressed between the frustoconical surfaces of the male and female adapters. An annular groove may also be provided along the frustoconical taper of the female adapter and may also include an O-ring, thus forming a seal external to the plastic liner. In addition, a third annular groove, which may also contain an O-ring, may be included along an inside surface of the female adapter to seal the annular area between the non-tapered portion of the tubing body and the female adapter. This third O-ring redundantly seals the annular area between the female adapter and the external surface of the composite coiled tubing above the point of thread run-out and also seals the female adapter threads from a hostile well environment. In summation, the three strategically placed O-rings may provide a fluid tight seal for the connection, both internal and external to the plastic liner.

In addition to high tensile holding strength and possibly effecting a fluid tight seal, this invention also facilitates providing a flush joint connection. A cylindrical axial bore through the male adapter substantially coincides with the bore of the coiled tubing such that an internal flush jointed connection is achieved. This feature is a significant advantage over prior art coiled tubing couplings that relied upon an inner sleeve component to internally support the coupling, thereby resulting in an ID reduction in the connection.

An additional embodiment of this invention involves a modification of the male adapter to facilitate coupling two strings of coiled tubing. The male adapter may be configured into a double-male, flush joint adapter, and may be used in lieu of the previously described male adapter. The double-male adapter may generally be similar to the previously discussed male adapters connected in opposing directions with a collar which may provide a swivel connection that may be made non-rotational with a set-screw or pin. The swivel may include annular grooves containing O-rings to provide a fluid tight seal in the swivel joint. This double-male adapter facilitates coupling multiple strings of composite coiled tubing and may also preferably provide an internal flush joint connection.

The foregoing disclosure and description of the coupling and components is illustrative and explanatory thereof. This invention is not intended to be limited to the illustrated and discussed embodiments, as one skilled in the art will appreciate that various changes in the size, shape and materials, as well as in the details of the construction or combinations of features of the adapters may be made without departing from the spirit of the invention. Various embodiments exist with alternative methods of attaching the coiled tubing to the female and/or male adapter, and for attaching a male and female adapter, including, but not limited to, compression type couplings in combination with an inner sleeve, thermal bonding, chemical bonding, pinning, snap-on, ball and groove type quick-connects, mechanical-electrical connectors, friction slip and grapple type couplings.

In addition, other embodiments may utilize alternative seal arrangements such as repositioning O-rings, using packing, compression type seals, plastic bushing inserts, thread sealant compound, or any other sealing modification. Other embodiments are considered for this invention which may construct any or all of the various components out of a variety of materials, including resinous compounds, other non-metallic compounds, metallic compounds, special alloys, or any combination thereof.

BRIEF DESCRIPTION OF THE DRAWINGS

FIG. 1 also illustrates, generally, a coiled tubing unit for transporting and manipulating coiled tubing strings at a well site.

FIG. 2 is a half-sectional view of another embodiment of the invention, illustrating a bonding method of attaching the coiled tubing to the female adapter.

FIG. 3 is a half-sectional view of a double-male, flush-joint male adapter, illustrating a swivel connection, an optional set screw and O-ring seals in the swivel.

DETAILED DESCRIPTION OF THE PREFERRED EMBODIMENTS

Figure 1A:
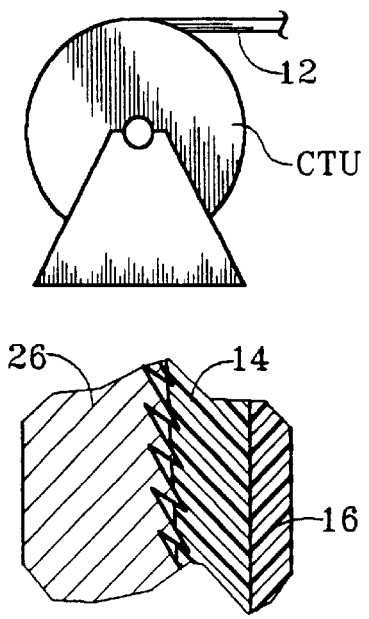
FIG. 1A is an enlarged cross-section view of the threaded connection between the coiled tubing and the female adapter shown in FIG. 1.
Figure 1B:
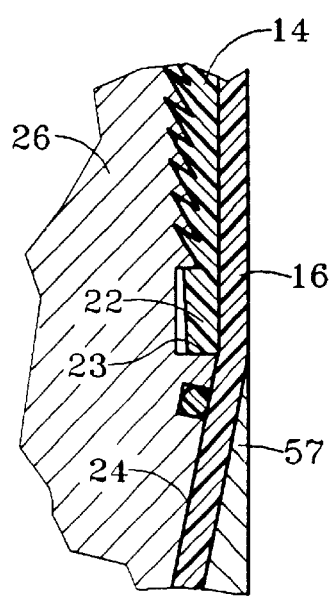
FIG 1B is an enlarged cross-section view of a portion of the coupling shown in FIG. 1.
Figure 1:
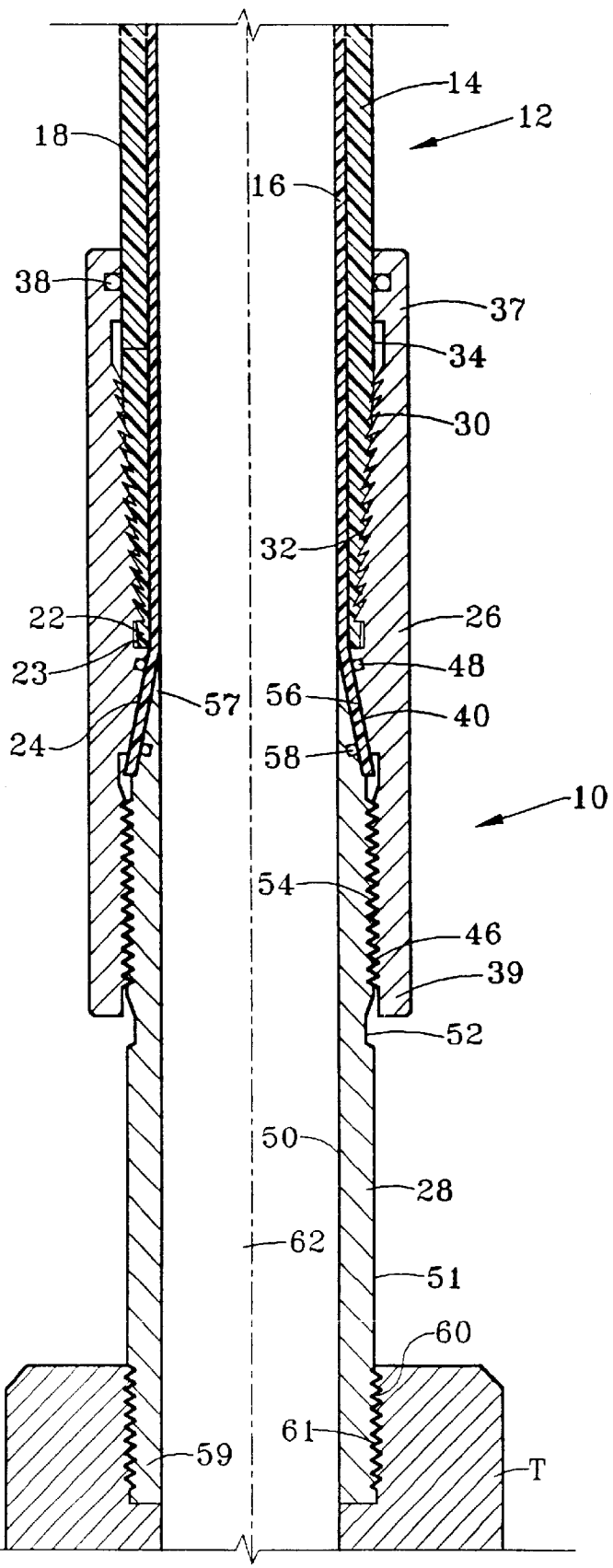
FIG. 1 is a cross-sectional view of a preferred embodiment of the invention, illustrating a negative flank thread profile method of attachment, sealing O-rings, and an internal flush joint. The male and female adapters are shown engaged on composite coiled tubing with a tool attached to the male adapter.

Reference is made to the attached drawings only for the purpose of demonstrating preferred embodiments and not for the purpose of limiting the same. FIG. 1 illustrates generally a reel or spool of composite coiled tubing CTU, as is typically provided by truck, barge, or ship, with the entire package referred to as a coiled tubing unit. FIG. 1 further illustrates the composite tubing 12 being unreeled and extended from the CTU for disposition, as for example, concentrically down a subterranean well for downhole service. In addition, FIG. 1 illustrates components of a preferred embodiment, including the remote or extended end of the composite tubing 12 coupled, by use of a metallic female adapter 26 which directly engages the composite, resinous and/or plastic tubing 12 and which also engages a metallic male adapter 28. The opposite end of the metallic male adapter 28 may then directly engage an instrument or tool T.

In a preferred embodiment, the engaged connection between the composite tubing 12 and the metallic female adapter 26, each having a bore along the length of its central axis 62, is provided by a threaded connection. In this embodiment, the external surface 18 of the tubing 12 may have a smooth, conical taper 30 over a determined length and may be shaped with a blunt, sharp, or otherwise dressed end 22 on the outer layer of tubing 14. A section of outer tube material 14 may be completely removed, thereby exposing a determined length of remaining plastic inner liner 16. The taper 30 on the surface 18 of the outer tube 14, the dressed end 22 and the removal of the outer layer of material 14 from the plastic liner 16 may be effected by conventional powered and/or hand tools. After tapering the outer tubing 14, the female adapter 26 may be engaged with the coiled tubing 12.

The female adapter 26 of this embodiment has an upper end 37 and a lower end 39, which are on opposite ends of the female adapter 26. The term "upper" as used herein correlates with FIG. 1, but is intended in its broad sense to mean the end to which the tubing is attached. The term "lower" as used herein correlates with FIG. 1, but is intended in its broad sense to mean the end opposite the end to which the tubing 12 is attached. The upper end 37 may include an internal set of conical threads 32, which may have a taper generally matching the taper 30 on the coiled tubing 12. In a preferred embodiment of this invention, these threads 32 include a negative flank thread profile for gripping, for example, the outer layer 14 of the coiled tubing 12. Negative flank threads, illustrated in FIG. 1A, include a thread profile in which both flanks of a thread generally angle in the same direction with respect to the central axis of the connection, thus forming a hook at the thread crest such that an axial force applied to the connection is translated in part towards the central axis of the connection and in part substantially perpendicular away from the central axis of the connection. In other words, the apex of both thread flanks is preferably located axially below the thread as seen in FIG. 1. As axial tension is increased on the tubing 12, the adapter threads 32 may engage deeper into the coiled tubing 14, affording tensile strength in the coupling 10 substantially the same as or greater than the tensile strength of the coiled tubing body 12. A radial annular recess 34 may be provided in the female adapter 26 in the transition zone from the tapered threads 32 to a cylindrical upper end 37 of the female adapter 26 and radially encompasses the non-tapered outer surface 18 of the coiled tubing 12. The end 37 of the female adapter 26 may thus be configured to provide rigidity and support to the connection by discouraging angular, vibrational or bending forces from effectively reaching the region of engagement between the coiled tubing 12 and female coupling 26.

To make-up the connection between coiled tubing 12 and the female adapter 26, the female adapter 26 may be slipped over the cut, dressed and tapered end of the coiled tubing 12 and the female adapter 26 may be engaged by threading onto the tubing 12 using conventional tools. Other embodiments are envisioned which may provide for attachment by bonding, pinning, or otherwise fastening the female adapter 26 to the coiled tubing 12 are discussed further below. When a connection is fully engaged, the dressed end 22 of the coiled tubing 12 may seat against a stop surface 23 in the female adapter 26, as illustrated in FIG. 1B, thereby providing protection for the tip of the outer layer 14 of the coiled tubing 12. In a preferred embodiment, female adapter threads 32 may run out onto the outer surface 18 of the coiled tubing 12. At this time, a cylindrical, portion of the inner plastic tube 16 may extend distally along the central axis of the female adapter 26 for a length sufficient to effect a seal, as discussed subsequently.

A female adapter 26 may be provided with an inner, frustoconical surface 56 selectively located along the central axis 62. A groove 48 may optionally be provided along the frustoconical surface 56 to house an O-ring to seal an annular area between the external surface 24 of a portion of the inner liner 16 and the frustoconical surface 56 of the female adapter 26. An extended, sleeve-shaped portion of inner plastic liner 16 may be flared radially outward against frustoconical surface 56 of the female adapter 26 to enable concentric penetration of the inner liner 16 by another component, such as a male adapter 28, for engagement of the two components 26, 28.

A substantially cylindrical male adapter 28 may have an upper end 57 and a lower end 59 and having a cylindrical bore defined by internal surface 50 along the length of its central axis 62, and may include an external surface 40 substantially on or near the upper end 57, which may be frustoconical tapered to substantially match a surface in the female adapter 26, such as a frustoconical surface 56. The upper end 57 of the male adapter 28 may also be provided with a groove 58 to house an O-ring. In a preferred embodiment, the female adapter 26 may be fitted with threads 54 in the lower end 39 for engagement with the male adapter 28, which may also be provided with mating threads 46. As the male adapter 28 is engaged with the female adapter 26, frustoconical surface 40 of the male adapter 28 may penetrate the flared opening of the inner liner 16 of the coiled tubing 12, compressing the plastic inner liner 16 between frustoconical surfaces 40 and 56, such that O-rings in grooves 48 and 58 are engaged to effect a fluid-tight seal both internal and external to the inner plastic liner 16. A redundant, external seal between the external surface 18 of the coiled tubing 12 and the female adapter 26 may be effected by providing a groove 38 in the female adapter 26 to house an O-ring. The annular area between the two externally sealing O-rings in grooves 38 and 48 provides an atmospherically pressured chamber which will tend to collapse as the coupling system 10 is lowered in a well bore, thus tightening engagement between the outer surface 18 of the coiled tubing 12 and the inner threads 32 of the female adapter 26. A substantially flush, internal bore through the coiled tubing 12 and the coupling 10 may thus be provided along the central axis 62, coincident with the axis of the male adapter 28, the female adapter 26 and the coiled tubing 12.

A lower end 59 of the male adapter 28 which is axially opposite the upper end 57 that engages the female adapter 26, may include threads 60 for engagement with threads 61 in an instrument or tool T. FIG. 2 illustrates an alternative embodiment of a coupling 70 for connecting a female adapter 74 to the coiled tubing 12, wherein the threads 32 in the female adapter 26 illustrated in FIG. 1 may be omitted and a smooth bore, tapered inner surface 76 may be provided in the female adapter 74. Coiled tubing 12 may be tapered 30 and dressed on the end 22 as in the previously discussed embodiment, including an external smooth taper 30, dressed end 22, an inner plastic liner 16 and outer layer 14. An annular space 34 and a groove 38 for housing an O-ring may or not be included in this embodiment 70. The upper end 37 of the female adapter 74 may extend over a portion of the non-tapered coiled tubing 12. The tubing 12 may be bonded with the female adapter 74 using a conventional bonding material such as a high grade epoxy. Other methods of engagement are also possible. As in the previous embodiment 10, in this embodiment 70, a full bore, internal, substantially flush joint connection may be provided, having a bore along its center axis 62 that substantially coincides with a bore of a male adapter 28 and the coiled tubing 12.

An additional feature of this invention may facilitate coupling multiple strings of coiled tubing. FIG. 3 illustrates a double-male flush joint adapter 80. This component is substantially analogous to two opposed male adapters 82, 92, which are each similar to male adapter 28. The two male adapters 82, 92 are adjacently arranged in diametrically opposed directions, and a swivel connection is provided between the male adapters 82, 92 that permits rotation of one coiled tubing string 12 relative to another (not shown), or relative to any other component engaged on the end opposite the end which may be engaged with a female adapter 26, 74. A metallic, generally cylindrical adapter 80 may be provided having a substantially cylindrical bore along its center axis 62, which may substantially coincide with a bore through the central axis 62 of a coiled tubing 12. This double-male adapter may be comprised of differing or similar male adapters 82, 92, which may be connected by a coupling 86, having female threads 89 for engagement with male threads 88 on an upper male adapter 82. In this embodiment, male threads 88 and female threads 89 are made-up until the coupling 86 engages against the shoulder 93 of the external upset 91. The opposite end of the coupling 86 opposite the shoulder 93 may have a female internal upset shoulder 87 for engagement with an external upset shoulder 90 on male adapter 92. A fluid-tight seal may be maintained in an annulus area between the male adapters 82 and 92 and the coupling 86 by providing grooves on the male adapters 82, 92 to house O-rings 96,97 which may seat against the inner surface 98 of the coupling 86. This arrangement provides a swiveling function to the double-male adapter 80. Threads 54, 55 on the male adapters 82,92 are intended for engagement with respective upper and lower adapters.

The double-male flush joint adapter 80 may also include frustoconical surfaces 40, 43, and/or may be provided with grooves 84, 85 to house O-rings. Engagement of the double-male adapter 80 may compress an inner liner 16 of the coiled tubing 12 between a frustoconical surface 56 of the female adapter 26 or 74 and a frustoconical surface 40,43 of the male adapter. Both the compression of the inner liner 16 and the previously discussed optional O-rings in grooves 84, 85 may provide a fluid tight seal.

The double-male flush joint adapter 80 as illustrated in FIG. 3 may be employed in a swivel mode or, if swiveling is not desired, a pinning device or set screw 94 may be provided to prevent relative rotation of components. Reduction areas 52, 53 may but need not be included.

Based upon the above disclosure, those skilled in the art will appreciate that the coupling and component parts of the present invention has utility in various applications for coupling composite tubulars and non-composite tubulars to various tools, instruments and to other strings of tubulars and that the exemplary application described herein is generally illustrative of a suitable application. An alternative method for engagement of the female adapter 26 or 74 with the male adapter 28, 82 or 92 may include pins, bonding, mechanical connections with electrical connectors, snap-lock connections or any other fastening device or method. In addition, reduction areas 52 may but need not be provided on the external surface 51 of the male adapter 28. Although threads 88 and 89 are illustrated in this embodiment of the double-male adapter 80, other variations of attachment or fastening the male adapters 82, 92 of the double-male adapter 80 to each other are also envisioned in other embodiments, including pins or set-screws. In addition, an embodiment may not utilize upsets and shoulders 87, 90 or 91 or may utilize different configurations of upsets and shoulders. The double-male adapter 80 may include ball-bearings and a race to enhance swiveling and load-carrying properties, or it may provide a ball-and-socket joint.

The coupling of this invention may be adapted for use with composite and as well as non-composite tubulars, such as steel, copper, aluminum and other metallics, rubber, nylon, PVC, CPVC, polyethylene, fiberglass, transite and other non-metallic tubular materials. Mechanical-electrical type connectors and connections may be incorporated within or about the coupling, including pin type connections, hard-wired connections, plug-in type connections and any other common electrical or mechanical connection which may be made a sub-component of a component or embodiment of this invention.

Embodiments for the coupling may include uses other than with coiled tubulars, including use with jointed tubulars as well as non-well bore uses. Applications may also include a coupling for use with a wide variety of sizes of tubulars, ranging from less than one-quarter inch to very large tubulars of six inches or more.

As applied to composite coiled tubulars, this invention may be used with many embodiments of composite coiled tubing, including coiled tubing consisting of an inner plastic tube 16 concentrically encased in and reinforced by an outer tube 14, which may be composed of braided or arranged fibrous material which may be combined with or laminated in an epoxy or other resinous plastic material such that the inner tube may be an integral part of or distinctly separate from the outer tube. Other embodiments of composite coiled tubing may consist of a uniform material or combinations of materials formed into a substantially homogenous tube; or a tube that may embody multiple concentric layers of tubes, or a tube composed of laminar layers of materials.

The bonding method of engagement illustrated herein, includes, but is not limited to, chemical and thermal bonding, bonding using epoxies and bonding using resin based materials, plastics, solvents, welding, soldering, gluing and any other adhesive or engagement method and material.

The male-adapter 28 or the double-male adapter 80 may, on the lower end, be attached to any tool or instrument, including but not limited to any device for effecting any type of need, service, work or enhancement to the coiled tubing system. Tools may include bits, motors, jets, cutters, foam generators, cleaners, washers, seating nipples, plugs, service tools, production tools, drilling tools, workover tools or any other device, appendage or mechanism. Instruments may include logging, measuring, viewing, recording, probing, communicating or any other such device as may be used with coiled tubing.

Depending up the type of material from which the inner liner 16 of the composite coiled tubing 12 is fabricated, the compressive forces may be sufficient to form a fluid tight seal with both the male adapter 28 and the female adapter 26, such that grooves 58 and/or 48 and the O-rings may be eliminated. The elimination of the O-rings is particularly feasible if the material for the inner liner is a relatively soft plastic or elastomeric material.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A coiled tubing connector, comprising:
   a female adapter having a tapered internal thread for threaded engagement with an external surface of the coiled tubing;
   a frustoconical inner surface on the female adapter and spaced axially from the tapered internal thread;
   a male adapter having a frustoconical outer surface for compressing a portion of the coiled tubing into engagement with the frustoconical inner surface on the female adapter; and
   an adapter connector for structurally interconnecting the female adapter and the male adapter.

2. The coiled tubing connector as defined in claim 1, further comprising:
   an annular seal for sealing engagement between the male adapter and an internal surface of the portion of the coiled tubing compressed between the frustoconical inner surface and the frustoconical outer surface.

3. The coiled tubing connector as defined in claim 2, further comprising:
   another annular seal for sealing engagement between a female adapter and an outer surface of the portion of the coiled tubing compressed between the frustoconical inner surface and the frustoconical outer surface.

4. The coiled tubing connector as defined in claim 3, wherein the annular seal is positioned within a groove in the male adapter, and wherein the another annular seal is positioned within another groove in the female adapter.

5. The coiled tubing connector as defined in claim 1, further comprising:
   the portion of the coiled tubing compressed between the frustoconical inner surface and frustoconical outer surface being an inner sleeve-shaped portion of the coiled tubing.

6. The coiled tubing connector as defined in claim 1, wherein the male adapter has a bore along its axial length which substantially coincides with a bore of the coiled tubing.

7. The coiled tubing connector as defined in claim 1, wherein the connector has pressure and tensile strength substantially equal to the pressure and tensile strength of the coiled tubing.

8. The coiled tubing connector as defined in claim 1, wherein the tapered internal thread on the female adapter has a negative thread flank.

9. The coiled tubing connector as defined in claim 1, wherein the tapered internal thread on the female adapter runs out onto an external cylindrical surface on the coiled tubing.

10. The coiled tubing connector as defined in claim 9, wherein the adapter connector comprises:
    threads on the female adapter and mating threads on the male adapter.

11. The coiled tubing connector as defined in claim 1, wherein the male adapter includes a rotary swivel, such that one end of the male adapter may be rotated relative to an opposing end of the male adapter while maintaining the fluid-tight seal along an axial length of the male adapter.

12. A coiled tubing system, comprising:
    a first length of coiled tubing;
    a second length of coiled tubing; and
    a coiled tubing connector including a female adapter having a tapered internal thread with a negative flank for threaded engagement with an external surface of the coiled tubing, a frustoconical inner surface on the female adapter and spaced axially from the tapered internal thread, a male adapter having a frustoconical outer surface for compressing a portion of the coiled tubing into engagement with the frustoconical inner surface on the female adapter and an adapter connector for structurally interconnecting the female adapter and the male adapter.

13. The coiled tubing system as defined in claim 12, further comprising:
    an annular seal for sealing engagement between the male adapter and an internal surface of the portion of the coiled tubing compressed between the frustoconical inner surface and the frustoconical outer surface.

14. The coiled tubing system as defined in claim 13, further comprising:
    another annular seal for sealing engagement between a female adapter and an outer surface of the portion of the coiled tubing compressed between the frustoconical inner surface and the frustoconical outer surface.

15. The coiled tubing system as defined in claim 14, wherein the annular seal is positioned within a groove in the male adapter, and wherein the another annular seal is positioned within another groove in the female adapter.

16. The coiled tubing system as defined in claim 12, further comprising:
    the portion of the coiled tubing compressed between the frustoconical inner surface and frustoconical outer surface being an inner sleeve-shaped portion of the coiled tubing.

17. The coiled tubing system as defined in claim 12, wherein the male adapter has a bore along its axial length which substantially coincides with a bore of the coiled tubing.

18. The coiled tubing system as defined in claim 12, wherein the tapered internal thread on the female adapter runs out onto an external cylindrical surface on the coiled tubing.

19. The coiled tubing system as defined in claim 12, wherein the male adapter includes a rotary swivel, such that one end of the male adapter may be rotated relative to an opposing end of the male adapter while maintaining the fluid-tight seal along an axial length of the male adapter.

20. A method of interconnecting a body to coiled tubing, comprising:

providing a female adapter with a tapered internal thread;

threading the female adapter to an end of the coiled tubing;

compressing a portion of the coiled tubing between a frustoconical inner surface on the female adapter and a frustoconical outer surface on a male adapter;

providing a fluid-tight seal between male adapter and a portion of the coiled tubing compressed between the frustoconical inner surface and the frustoconical outer surface; and interconnecting the male adapter and the female adapter.

21. The method as defined in claim 20, wherein the coiled tubing includes a sleeve-shaped plastic inner body and an outer structural sleeve; and a portion of the inner plastic body is compressed between the frustoconical outer surface and the frustoconical inner surface.

22. The method as defined in claim 20, wherein the inner plastic body is deformed in a swedging operation subsequent to threading the female adapter to the coiled tubing.

23. The method as defined in claim 20, wherein a bore of the male adapter along its axial length substantially coincides with a bore of the coiled tubing.

24. The method as defined in claim 20, wherein the tapered internal thread on the female adapter is configured with a negative thread flank.

25. The method as defined in claim 20, wherein the connector is sized such that pressure and tensile strength is substantially equal to the pressure and tensile strength of the coiled tubing.

26. The method as defined in claim 20, wherein the tapered internal thread on the female adapter runs out onto an external cylindrical surface on the coiled tubing.

27. The method as defined in claim 20, further comprising:

forming another annular seal between a female adapter and an outer surface of the portion of the coiled tubing compressed between the frustoconical inner surface and the frustoconical outer surface.

* * * * *